(12) United States Patent
De Palo et al.

(10) Patent No.: US 10,730,238 B2
(45) Date of Patent: *Aug. 4, 2020

(54) PLATE COMPRISING A POLYOLEF IN COMPOSITION FOR 3D PRINTER

(71) Applicant: BASELL POLIOLEFINE ITALIA S.R.L., Milan (IT)

(72) Inventors: Roberto De Palo, Ferrara (IT); Claudio Cavalieri, Ferrara (IT); Monica Galvan, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/339,101
(22) PCT Filed: Sep. 22, 2017
(86) PCT No.: PCT/EP2017/074123
§ 371 (c)(1),
(2) Date: Apr. 3, 2019
(87) PCT Pub. No.: WO2018/065244
PCT Pub. Date: Apr. 12, 2018

(65) Prior Publication Data
US 2019/0283322 A1 Sep. 19, 2019

(30) Foreign Application Priority Data
Oct. 6, 2016 (EP) ..................................... 16192535

(51) Int. Cl.
*B29C 64/245* (2017.01)
*C08L 23/08* (2006.01)
(Continued)

(52) U.S. Cl.
CPC .......... *B29C 64/245* (2017.08); *C08F 210/16* (2013.01); *C08L 23/06* (2013.01);
(Continued)

(58) Field of Classification Search
CPC ...... C08L 23/10; C08L 23/16; C08L 2205/02; C08L 2205/03; C08L 2203/16
See application file for complete search history.

(56) References Cited

U.S. PATENT DOCUMENTS 5,453,466 A * 9/1995 Pellegatti ................ C08L 23/12
525/240
7,125,924 B2 * 10/2006 Credali ................... C08L 23/10
524/425
(Continued)

FOREIGN PATENT DOCUMENTS

EP        2540499 A1 *  1/2013  ............. B32B 27/34
WO  WO-2006062956 A2 *  6/2006  ............. C08F 10/00
(Continued)

OTHER PUBLICATIONS

International Search Report and Written Opinion dated Nov. 13, 2017 (dated Jun. 13, 2017) for Corresponding PCT/EP2017/074123.

(Continued)

*Primary Examiner* — Michael M Dollinger

(57) ABSTRACT

A plate for use in an extrusion-based additive manufacturing system made from or containing a top layer made from or containing a sheet or film made from or containing polyolefin composition A) made from or containing (i) 5-35% by weight of a propylene homopolymer or a propylene ethylene copolymer;

(ii) 20-50% by weight of a copolymer of ethylene and a $C_3$-$C_8$ alpha-olefin; and (iii) 30-60% by weight of a copolymer of ethylene and propylene wherein the amounts of (i), (ii) and (iii) being referred to the total weight of (i)+(ii)+(iii) and the sum of the amount of (i), (ii) and (iii) being 100.

10 Claims, 1 Drawing Sheet

(51) Int. Cl.
*C08L 23/12* (2006.01)
*C08L 23/14* (2006.01)
*C08L 23/06* (2006.01)
*C08F 210/16* (2006.01)
*B33Y 30/00* (2015.01)

(52) U.S. Cl.
CPC ........... *C08L 23/0815* (2013.01); *C08L 23/12* (2013.01); *C08L 23/14* (2013.01); *B33Y 30/00* (2014.12); *C08L 2203/16* (2013.01); *C08L 2205/025* (2013.01); *C08L 2205/03* (2013.01); *C08L 2308/00* (2013.01); *C08L 2314/02* (2013.01)

(56) References Cited

U.S. PATENT DOCUMENTS

| | | | |
|---|---|---|---|
| 7,981,982 B2 * | 7/2011 | Cagnani | C08F 210/16 526/64 |
| 10,501,616 B2 * | 12/2019 | Galvan | C08L 23/10 |
| 2004/0041299 A1 * | 3/2004 | Kim | C08J 5/18 264/176.1 |
| 2015/0166778 A1 * | 6/2015 | Fantinel | C08L 23/0815 428/36.9 |
| 2015/0232643 A1 * | 8/2015 | Herklots | B29C 43/00 264/523 |
| 2016/0347941 A1 * | 12/2016 | Nakajima | C08K 5/0083 |
| 2019/0160795 A1 * | 5/2019 | Galvan | B32B 27/08 |

FOREIGN PATENT DOCUMENTS

| | | |
|---|---|---|
| WO | 2015/161398 A1 | 10/2015 |
| WO | 2016/207235 A1 | 12/2016 |
| WO | 2016/207236 A1 | 12/2016 |

OTHER PUBLICATIONS

O.S. Carneiro et al: "Fused Deposition Modeling With Polypropylene", Materials & Design, vol. 83, June 20, 2015 (Jun. 20, 2015), pp. 768-776, XP055312954, Amsterdam, NL—ISSN: 0264-1275, DOI: 10.1016/J.MATDES.2015.06.053 The Whole Document.

* cited by examiner

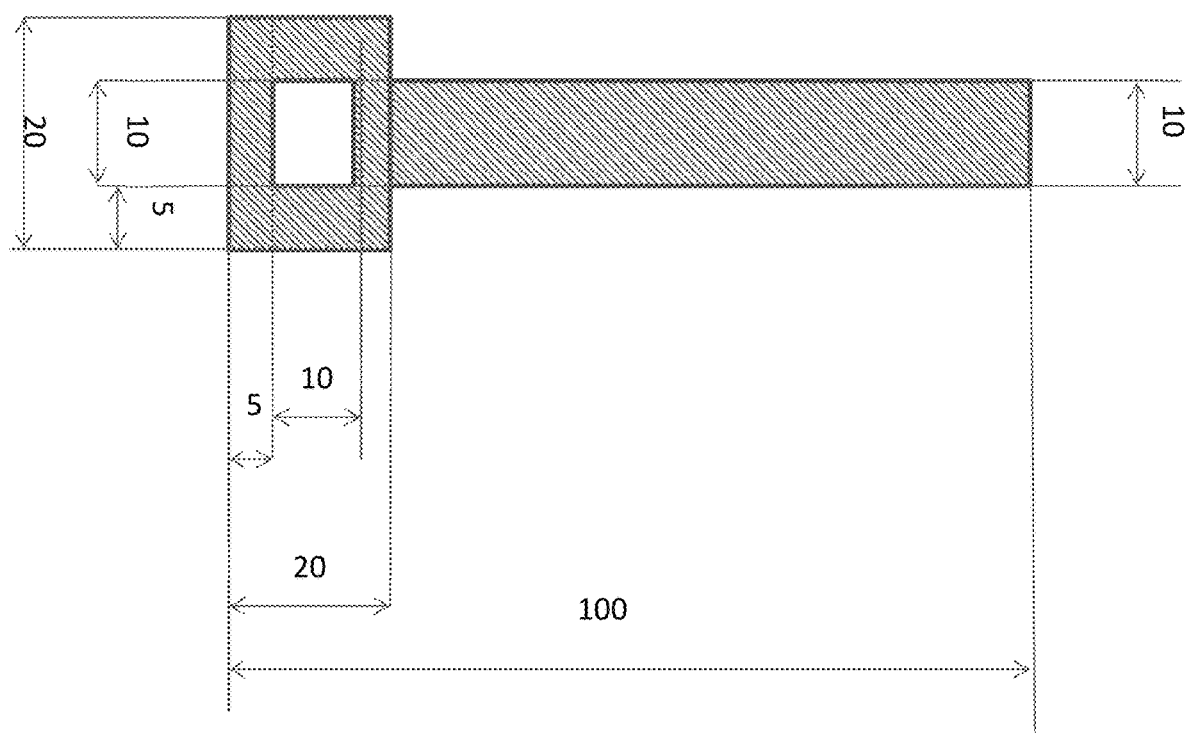

PLATE COMPRISING A POLYOLEFIN COMPOSITION FOR 3D PRINTER

This application is the U.S. National Phase of PCT International Application PCT/EP2017/074123, filed Sep. 22, 2017, claiming benefit of priority to European Patent Application No. 16192535.9, filed Oct. 6, 2016, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a base plate material made from or containing a polyolefin composition.

BACKGROUND OF THE INVENTION

An extrusion-based 3D printer is used to build a 3D model from a digital representation of the 3D model in a layer-by-layer manner by extruding a flowable modeling material. For example, a filament of the modeling material is extruded through an extrusion tip carried by an extrusion head and deposited as a sequence of roads on a substrate in an x-y plane. In some instances, the melted material is derived from a direct deposition from a screw extruder or similar or sintered from powders (SLS) The extruded modeling material fuses to previously-deposited modeling material and solidifies upon a drop in temperature. In some instances, the position of the extrusion head relative to the substrate is then incremented along a z-axis (perpendicular to the x-y plane), and the process is repeated to form a 3D model resembling the digital representation. Movement of the extrusion head with respect to the substrate is performed under computer control, in accordance with build data that represents the 3D model. The build data is obtained by slicing the digital representation of the 3D model into multiple horizontally sliced layers. For each sliced layer, the host computer generates a build path for depositing roads of modeling material to form the 3D model.

In the printing process the holds the printing object such that the object does not move during the printing while allowing easy removal of the object when the printing is terminated.

SUMMARY OF THE INVENTION

A plate made from or containing a top layer made from or containing a sheet or film made from or containing a polyolefin composition A) is useful as a plate for extrusion-based 3D printing, wherein polyolefin composition A) is made from or contains:

(i) 5-35% by weight of a propylene homopolymer containing 5% by weight or less of a fraction soluble in xylene at 25° C. ($XS_i$), or a propylene ethylene copolymer containing 90% by weight or more of propylene units and containing 10% by weight or less of a fraction soluble in xylene at 25° C. ($XS_i$), both the amount of propylene units and of the fraction $XS_i$ being referred to the weight of (i);

(ii) 20-50% by weight of a copolymer of ethylene and a $C_3$-$C_8$ alpha-olefin containing from 0.1% to 20% by weight of alpha-olefin units and containing 25% by weight or less of a fraction soluble in xylene at 25° C. ($XS_{ii}$), both the amount of alpha-olefin units and of the fraction $XS_B$ being referred to the weight of (ii); and (iii) 30-60% by weight of a copolymer of ethylene and propylene containing from 25% to 75% by weight of ethylene units and containing from 40% to 95% by weight of a fraction soluble in xylene at 25° C. ($XS_{iii}$), both the amount of ethylene units and of the fraction $XS_{iii}$ being referred to the weight of (iii);

the amounts of (i), (ii) and (iii) being referred to the total weight of (i)+(ii)+(iii), the sum of the amount of (i), (ii) and (iii) being 100.

BRIEF DESCRIPTION OF THE DRAWINGS

FIG. 1 is a front view of an embodiment of a plate, which was used for the Examples. The measurements are in mm. When the 3D-printed object was complete, the object was 5 mm thick.

DETAILED DESCRIPTION OF THE INVENTION

In a general embodiment, a plate for extrusion-based 3D printing is made form or contains a top layer made from or containing a sheet or film made from or containing a polyolefin composition A) made from or containing (i) 5-35% by weight; alternatively 10-30% by weight; alternatively 15-23% by weight of a propylene homopolymer containing 5% by weight or less of a fraction soluble in xylene at 25° C. ($XS_i$), or a propylene ethylene copolymer containing 90% by weight or more; alternatively 95% by weight or more; alternatively 97% by weight or more of propylene units and containing 10% by weight or less of a fraction soluble in xylene at 25° C. ($XS_i$), both the amount of propylene units and of the fraction $XS_i$ being referred to the weight of (i);

(ii) 20-50% by weight; alternatively 25-45% by weight; alternatively 30-40% by weight copolymer of ethylene and a $C_3$-$C_8$ alpha-olefin containing from 0.1% to 20% by weight; alternatively from 5% to 15% by weight; alternatively from 7% to 12% by weight of alpha-olefin units and containing 25% by weight or less; alternatively from 20% by weight or less; alternatively 17% by weight or less of a fraction soluble in xylene at 25° C. ($XS_{ii}$), both the amount of alpha-olefin units and of the fraction $XS_B$ being referred to the weight of (ii); and (iii) 30-60% by weight; alternatively 35-55% by weight; alternatively 40-50% by weight of a copolymer of ethylene and propylene containing from 25% to 75% by weight; alternatively from 37% to 65% by weight; alternatively from 45% to 58% by weight of ethylene units and containing from 40% to 95% by weight of a fraction soluble in xylene at 25° C. ($XS_{iii}$), both the amount of ethylene units and of the fraction $XS_{iii}$ being referred to the weight of (iii);

the amounts of (i), (ii) and (iii) being referred to the total weight of (i)+(ii)+(iii), the sum of the amount of (i), (ii) and (iii) being 100.

In some embodiments, component (i) has a melt flow rate (230° C./2.16 kg) ranging between 50 and 200 g/10 min; alternatively between 80 and 170 g/10 min.

In some embodiments, components (i)+(ii) blended together have a melt flow rate (230° C./2.16 kg) between 0.1 and 60 g/10 min.; alternatively between 1 and 50 g/10 min; alternatively between 8 and 40 g/10 min.

In some embodiments, component (ii) has a density (determined according to ISO 1183 at 23° C.) of from 0.900 to 0.965 g/cm$^3$. In some embodiments, the alpha-olefin comonomers are selected from the group consisting of propylene, 1-butene, 1-pentene, 4-methyl-1-pentene, 1-hexene and 1-octene. In some embodiments, the alpha-olefin comonomers are selected from the group consisting of 1-butene 1-hexene and 1-octene. In some embodiments, the alpha-olefin comonomer is 1-butene.

In some embodiments, the polyolefin composition A) has a melt flow rate (230° C./2.16 kg) between 0.1 and 6.0 g/10 min; alternatively between 0.5 and 5.5 g/10 min; alternatively between 1.0 and 5.0 g/10 min.

In some embodiments, the polyolefin composition A) has an intrinsic viscosity [η] (measured in tetrahydronaphthalene at 135° C.) of the xylene soluble fraction at 25° C. between 1.0 to 4.0 dl/g; alternatively between 1.5 and 3.5 dl/g; alternatively between 2.0 and 3.0 dl/g.

As used herein, the term "copolymer" refers to polymers containing two kinds of comonomers such as propylene and ethylene or ethylene and 1-butene.

The comonomer content is determined by using 13C-NMR.

In some embodiments, the plate is useful in an extrusion-based additive manufacturing system.

As used herein, the term "sheet" refers to sheet having thickness higher than 0.5 mm. As used herein, the term "film" refers to sheet having thickness lower than 0.5 mm.

In some embodiments, the plate has other layers in addition to the top layer. In some embodiments, the other layers are made from various materials. In some embodiments, the various materials are selected from the group consisting of polystyrene polypropylene, and metals. In some embodiments, the metal is aluminum. In some embodiments, the plate is heatable. In some embodiments, the plate is made from or contains a monolayer film or a multilayer film. In some embodiments, the top layer is made from or contains at least 50 wt %, alternatively at least 70 wt %, alternatively at least 85 wt %, alternatively more than 99 wt %, of composition A. In some embodiments, the plate is a sheet or film of composition A.

In some embodiments, polyolefin composition A) is prepared by a sequential polymerization, including at least three sequential steps, wherein components (i), (ii) and (iii) are prepared in separate subsequent steps, operating in each step, except the first step, in the presence of the polymer formed and the catalyst used in the preceding step. In some embodiments, the catalyst is added only in the first step. In some embodiments, the catalyst is active for the subsequent steps.

In some embodiments, the polymerization process is continuous. In some embodiments, the polymerization process is batch. In some embodiments, the polymerization process operates in liquid phase. In some embodiments, the process may contain an inert diluent. In some embodiments, the polymerization process operates in gas phase. In some embodiments, the polymerization process operates in mixed liquid-gas techniques.

In some embodiments, the reaction temperature is from 50 to 100° C. In some embodiments, the reaction pressure is atmospheric or higher.

In some embodiments, the molecular weight of the polymer is regulated. In some embodiments, the regulator is hydrogen.

In some embodiments, the polymerization is carried out in the presence of a Ziegler-Natta catalyst. In some embodiments, the Ziegler-Natta catalyst is made from or contains the product of the reaction of an organometallic compound of group 1, 2 or 13 of the Periodic Table of elements with a transition metal compound of groups 4 to 10 of the Periodic Table of Elements (new notation). In some embodiments, the transition metal compound is selected from the group consisting of compounds of Ti, V, Zr, Cr and Hf. In some embodiments, the transition metal compound is supported on $MgCl_2$.

In some embodiments, the catalysts are made from or contain the product of the reaction of an organometallic compound of group 1, 2 or 13 of the Periodic Table of elements, with a solid catalyst component made from or containing a Ti compound and an electron donor compound supported on $MgCl_2$.

In some embodiments, the organometallic compounds are aluminum alkyl compounds.

In some embodiments, the polymer composition A) is obtainable by using a Ziegler-Natta polymerization catalyst, alternatively a Ziegler-Natta catalyst supported on $MgCl_2$, alternatively a Ziegler-Natta catalyst made from or containing the product of reaction of:

1) a solid catalyst component made from or containing a Ti compound and an electron donor (internal electron-donor) supported on $MgCl_2$;
2) an aluminum alkyl compound (cocatalyst); and, optionally,
3) an electron-donor compound (external electron-donor).

In some embodiments, the solid catalyst component (1) contains as electron-donor a compound selected from the group consisting of ethers, ketones, lactones, compounds containing N, P and/or S atoms, and mono- and dicarboxylic acid esters.

In some embodiments, the catalysts are the catalysts disclosed in U.S. Pat. No. 4,399,054 and European Patent No. 45977.

In some embodiments, the electron-donor compounds are selected from the group consisting of phthalic acid esters and succinic acid esters. In some embodiments, the electron-donor compound is diisobutyl phthalate.

In some embodiments, the electron-donor compound is selected from the group consisting of succinic acid esters represented by the formula (I):

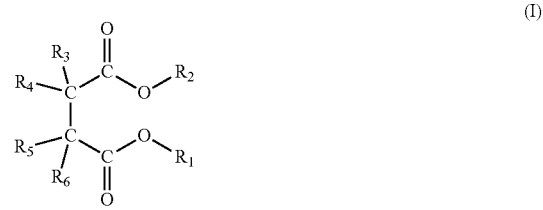

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle.

In some embodiments, $R_1$ and $R_2$ are selected from the group consisting of $C_1$-$C_8$ alkyl, cycloalkyl, aryl, arylalkyl and alkylaryl groups. In some embodiments, $R_1$ and $R_2$ are selected from primary alkyls, alternatively branched primary alkyls. In some embodiments, $R_1$ and $R_2$ groups are selected from the group consisting of methyl, ethyl, n-propyl, n-butyl, isobutyl, neopentyl, and 2-ethylhexyl. In some embodiments, $R_1$ and $R_2$ groups are selected from the group consisting of ethyl, isobutyl, and neopentyl.

In some embodiments, $R_3$ to $R_5$ are hydrogen and $R_6$ is a branched alkyl, cycloalkyl, aryl, arylalkyl and alkylaryl radical having from 3 to 10 carbon atoms. In some embodiments, at least two radicals from $R_3$ to $R_6$ are different from hydrogen and are selected from $C_1$-$C_{20}$ linear or branched alkyl, alkenyl, cycloalkyl, aryl, arylalkyl or alkylaryl group, optionally containing heteroatoms. In some embodiments, the compounds in which the two radicals different from hydrogen are linked to the same carbon atom. In some embodiments, the compounds in which at least two radicals different from hydrogen are linked to different carbon atoms. In some embodiments, the different carbon atoms are $R_3$ and $R_5$ or $R_4$ and $R_6$.

In some embodiments, the electron-donors are the 1,3-diethers. In some embodiments, the 1,3-diethers are as disclosed in published European Patent Application Nos. EP-A-361 493 and 728769.

In some embodiments, the cocatalysts (2) are trialkyl aluminum compounds. In some embodiments, the trialkyl aluminum compounds are selected from the group consisting of as Al-triethyl, Al-triisobutyl and Al-tri-n-butyl.

In some embodiments, the electron-donor compounds (3) that are used as external electron-donors (added to the Al-alkyl compound) are made from or contain aromatic acid esters, heterocyclic compounds, and silicon compounds containing at least one Si—OR bond (where R is a hydrocarbon radical). In some embodiments, the aromatic acid esters are alkylic benzoates. In some embodiments, the heterocyclic compound is selected from the group consisting of 2,2,6,6-tetramethylpiperidine and 2,6-diisopropylpiperidine.

In some embodiments, the silicon compounds are those of formula $R^1_aR^2_bSi(OR^3)_c$, where a and b are integer numbers from 0 to 2, c is an integer from 1 to 3 and the sum (a+b+c) is 4; $R'$, $R^2$ and $R^3$ are alkyl, cycloalkyl or aryl radicals with 1-18 carbon atoms optionally containing heteroatoms.

In some embodiments, the silicon compounds are selected from the group consisting of (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$.

In some embodiments, the 1,3-diethers are used as external donors. In some embodiments, when the internal donor is a 1,3-diether, the external donor is omitted.

In some embodiments, the catalysts are precontacted with small quantities of olefin (prepolymerization), maintaining the catalyst in suspension in a hydrocarbon solvent and polymerizing at temperatures from room temperature to 60° C.

In some embodiments, the operation takes place in liquid monomer.

In some embodiments, the polyolefin composition A) is prepared as a physical blend of the separately-prepared components rather than as a reactor blend.

In some embodiments, the composition A) is used as a film on the plate as a top layer. In some embodiments, the film is a monolayer. In some embodiments, the film is a multilayer. In some embodiments, the film has an adhesive on one or both sides. In some embodiments, the film is easily replaced.

In some embodiments, the plate is heatable during the printing process.

In some embodiments, the plate is used with different filaments. In some embodiments, the filaments are selected from the group consisting of propylene-based filaments, nylon based filaments ABS based filaments, and PLA based filaments.

The following examples are given to illustrate and not to limit the present invention.

EXAMPLES

The data of the propylene polymer materials were obtained according to the following methods:

Characterizations

Xylene-Soluble Faction at 25° C. (XS or Xs)

The Xylene Soluble fraction was measured according to ISO 16152, 2005, but with the following deviations (provided within parentheses).

The solution volume was 250 ml (200 ml);

During the precipitation stage at 25° C. for 30 min, the solution, for the final 10 minutes, was kept under agitation by a magnetic stirrer (30 min, without any stirring at all);

The final drying step was done under vacuum at 70° C. (100° C.);

The content of the xylene-soluble fraction is expressed as a percentage of the original 2.5 grams and then, by difference (complementary to 100), the xylene insoluble %;

XS of component B) and C) was calculated by using the formula;

$$XS_{tot} = WaXS_A + WbXS_B + WcXS_C$$

wherein Wa, Wb and Wc are the relative amount of components A, B and C (A+B+C=1)

Melt Flow Rate

Measured according to ISO 1133 at 230° C. with a load of 2.16 kg, unless otherwise specified.

Intrinsic Viscosity IV

The sample was dissolved in tetrahydronaphthalene at 135° C. and poured into the capillary viscometer. The viscometer tube (Ubbelohde type) was surrounded by a cylindrical glass jacket, permitting temperature control with a circulating thermostatic liquid. The downward passage of the meniscus was timed by a photoelectric device.

The passage of the meniscus in front of the upper lamp starts the counter which had a quartz crystal oscillator. The meniscus stopped the counter as the meniscus passed the lower lamp and the efflux time was registered. The efflux time was converted into a value of intrinsic viscosity through Huggins' equation (Huggins, M. L., J. Am. Chem. Soc., 1942, 64, 2716) provided that the flow time of the pure solvent was known at the same experimental conditions (same viscometer and same temperature). A polymer solution was used to determine [η].

Comonomer ($C_2$ and $C_4$) Content Determined by Using $^{13}$C NMR $^{13}$C NMR spectra of base polymers and their fractions were acquired on a Bruker AV600 spectrometer equipped with cryo probe, operating 150.91 MHz MHz in the Fourier transform mode at 120° C. The peak of the Sδδ carbon (nomenclature according C. J. Carman, R. A. Harrington and C. E. Wilkes, Macromolecules, 10, 3, 536 (1977)) was used as an internal reference at 29.7 ppm. About 30 mg of sample were dissolved in 0.5 ml of 1,1,2,2 tetrachloroethane d2 at 120° C. Each spectrum was acquired with a 90° pulse, 15 seconds of delay between pulses and CPD to remove 1H-$^{13}$C coupling. 512 transients were stored in 65 K data points using a spectral window of 9000 Hz. The assignments of the spectra were made according to [M. Kakugo, Y. Naito, K. Mizunuma and T. Miyatake, Macromolecules, 16, 4, 1160 (2082)] and [E. T. Hsieh, J. C. Randall, Macromolecules, 15, 353-360 (1982)].

Triad distribution was obtained using the following relations:

$$PPP = 100 I_{10}/\Sigma$$

$$PPE = 100 I_6/\Sigma \quad EPE = 100 I_5/\Sigma$$

$BBB = 100 I_3 / \Sigma$ $BBE = 100 I_2 / \Sigma$ $EBE = 100 I_{11} / \Sigma$ $XEX = 100 I_{12} / \Sigma$ $XEE = 100 (I_1 + I_4) / \Sigma$ $EEE = 100 (0.5 I_9 + 0.25 (I_7 + I_8)) / \Sigma$ wherein $\Sigma = I_1 + I_2 + I_3 + I_4 + I_5 + I_6 + 0.25\ 17 + 0.25 I_8 + 0.5 I_9 + I_{10} + I_{11} + I_{12}$ and wherein X can be propylene (P) or 1-butene (B), and $I_1$ to $I_{12}$ are the areas of the corresponding carbon atoms as reported below (only selected triads and assignments being reported):

| Number | Chemical Shift (ppm) | Carbon | Sequence |
|---|---|---|---|
| $I_1$ | 37.64-37.35 | $S_{\alpha\delta}$ | PEE |
| $I_2$ | 37.35-37.15 | $T_{\beta\delta}$ | BBE |
| $I_3$ | 35.27-34.92 | $T_{\beta\beta}$ | BBB |
| $I_4$ | 34.39-33.80 | $S_{\alpha\delta}$ | BEE |
| $I_5$ | 33.13 | $T_{\delta\delta}$ | EPE |
| $I_6$ | 30.93-30.77 | $T_{\beta\delta}$ | PPE |
| $I_7$ | 30.39 | $S_{\gamma\delta}$ | BEEE |
| $I_8$ | 30.29 | $S_{\gamma\delta}$ | PEEE |
| $I_9$ | 29.97 | $S_{\delta\delta}$ | EEE |
| $I_{10}$ | 29.14-28.31 | $T_{\beta\beta}$ | PPP |
| $I_{11}$ | 26.70-26.55 | $2B_2$ | EBE |
| $I_{12}$ | 24.88-24.14 | $S_{\beta\beta}$ | XEX |

The molar content of ethylene (E), of propylene (P) and of 1-butene (B) was obtained from triads using the following relations:

$E(m\%) = EEE + XEE + XEX$ $P(m\%) = PPP + PPE + EPE$ $B(m\%) = BBB + BBE + EBE$

Melt Flow Rate (MFR)

The melt flow rate MFR of the polymer was determined according to ISO 1133 (230° C., 2.16 Kg or 190° C.:/2.16 kg)

The following commercial polymers were used for the plates

Adflex Q100F was a heterophasic propylene ethylene copolymer having an MFR of 0.6 g/10 min (230° C., 2.16 Kg) sold by LyondellBasell.

Filaments

Polymers PP4 and PP5 were extruded to form a filament having 1.75 mm of diameter.

PP4 was a commercial grade ADSYL 5C30F sold by LyondellBasell.

PP5 was a commercial grade RP 210M sold by LyondellBasell.

A commercial PLA filament was also used.

Examples 1—Preparation of Polyolefin Composition Component A

Catalyst Precursor

The solid catalyst component used in polymerization is a Ziegler-Natta catalyst component supported on magnesium chloride, containing titanium and diisobutylphthalate as internal donor, prepared as follows. An initial amount of microspheroidal MgCl2.2.8C2H5OH was prepared according to the method described in Example 2 of U.S. Pat. No. 4,399,054 but operating at 3,000 rpm instead of 10,000. The adduct was subjected to thermal dealcoholation at increasing temperatures from 30 to 130° C. operating in nitrogen current until the molar alcohol content per mol of Mg was 1.16. Into a 1000 mL four-necked round flask, purged with nitrogen, 500 mL of TiCl4 were introduced at 0° C. While stirring, 30 grams of the microspheroidal MgCl2.1.16C2H5OH adduct were added. The temperature was raised to 120° C. and maintained for 60 minutes. During the temperature increase, an amount of diisobutylphthalate was added to have a Mg/diisobutylphthalate molar ratio of 18. The stirring was stopped. The liquid was siphoned off. The treatment with TiCl4 was repeated at 100° C. for 1 hour in the presence of an amount of diisobutylphthalate to have a Mg/diisobutylphthalate molar ratio of 27. The stirring was stopped. The liquid was siphoned off. The treatment with TiCl4 was repeated at 100° C. for 30 min. After sedimentation and siphoning at 85° C., the solid was washed six times with anhydrous hexane (6×100 ml) at 60° C.

Catalyst System and Prepolymerization

The solid catalyst component was contacted at 30° C. for 9 minutes with aluminum triethyl (TEAL) and dicyclopentyldimethoxysilane (DCPMS), in a TEAL/DCPMS weight ratio equal to about 15 and in such quantity that the TEAL/solid catalyst component weight ratio was 4.

The catalyst system was subjected to prepolymerization by suspending the catalyst system in liquid propylene at 50° C. for about 75 minutes.

Polymerization

The polymerization was carried out continuously in a series of three gas-phase reactors equipped with devices to transfer the product from the first reactor to the second reactor. Into the first gas phase polymerization reactor, a propylene-based polymer (i) was produced by feeding the prepolymerized catalyst system, hydrogen (used as a molecular weight regulator), and propylene in a constant flow. The components were fed in a gaseous state. The propylene-based polymer (i) coming from the first reactor was discharged in a continuous flow. After purging the propylene-based polymer (i) of unreacted monomers, the propylene-based polymer (i) was introduced in a continuous flow into the second gas phase reactor with quantitatively constant flows of hydrogen and ethylene. The components were fed in a gaseous state. In the second reactor, a copolymer of ethylene (ii) was produced. The product coming from the second reactor was discharged in a continuous flow. After purging the second-reactor product of unreacted monomers, the second-reactor product was introduced in a continuous flow into the third gas phase reactor with quantitatively constant flows of hydrogen, ethylene and propylene. The components were fed in a gaseous state. In the third reactor an ethylene-propylene polymer (iii) was produced. Polymerization conditions, molar ratio of the reactants and composition of the copolymers obtained are shown in Table 1. The polymer particles exiting the third reactor were subjected to a steam treatment to remove the reactive monomers and volatile substances and then dried. The polymer particles were mixed with a stabilizing additive composition in a twin screw extruder Berstorff ZE 25 (length/diameter ratio of screws: 34) and extruded under nitrogen atmosphere in the following conditions:

Rotation speed: 250 rpm;
Extruder output: 15 kg/hour;
Melt temperature: 245° C.

The stabilizing additive composition was made of the following components:

0.1% by weight of Irganox® 1010;
0.1% by weight of Irgafos® 168;
0.04% by weight of DHT-4A (hydrotalcite);

the percent amounts being referred to the total weight of the polymer and stabilizing additive composition.

Irganox® 1010 is 2,2-bis[3-[5-bis(1,1-dimethylethyl)-4-hydroxyphenyl)-1-oxopropoxy]methyl]-1,3-propanediyl-3,5-bis(1,1-dimethylethyl)-4-hydroxybenzene-propanoate while Irgafos® 168 is tris(2,4-di-tert.-butylphenyl)phosphite. The characteristics relating to the polymer composition, reported in Table 2, were obtained from measurements carried out on the extruded, stabilized ethylene polymer composition.

TABLE 1

| Polymerization conditions | | Example 1 |
|---|---|---|
| 1$^{st}$ Reactor - component (i) | | |
| Temperature | °C. | 60 |
| Pressure | barg | 16 |
| H$_2$/C$_3$- | mol. | 0.24 |
| Split | wt % | 22 |
| Xylene soluble of (i) (XS$_i$) | wt % | 4.2 |
| MFR of (i) | g/10 min. | 110 |
| 2$^{nd}$ Reactor - component (ii) | | |
| Temperature | °C. | 80 |
| Pressure | barg | 18 |
| H$_2$/C$_2$- | mol. | 0.81 |
| C$_4$-/(C$_2$- + C$_4$-) | mol. | 0.25 |
| Split | wt % | 32 |
| C$_2$- content of i* | wt % | 90 |
| C$_4$- content of i* | wt % | 10 |
| Xylene soluble of i (XS$_i$)* | wt % | 16.0 |
| Xylene soluble of (i + i) | wt % | 12.0 |
| MFR of (i + ii) | g/10 min. | 35.9 |
| 3$^{rd}$ Reactor - component (iii) | | |
| Temperature | °C. | 65 |
| Pressure | barg | 18 |
| H$_2$/C$_2$- | mol. | 0.17 |
| C$_2$-/(C$_2$- + C$_3$-) | mol. | 0.42 |
| Split | wt % | 46 |
| C$_2$- content of iii* | wt % | 52 |
| Xylene soluble of (iii) (XS$_{iii}$)* | wt % | 83 |

C2- = ethylene;
C3- = propylene;
C4- = 1-butene (IR);
split = amount of polymer produced in the concerned reactor.
*Calculated values.

TABLE 2

| properties of component A | | Example 1 |
|---|---|---|
| component i | | |
| C2 content | wt % | 0 |
| XSi | wt % | 4.2 |
| MFR | g/10 min | 110 |
| split | wt % | 22 |
| component ii | | |
| XSi* | wt % | 16 |
| C2 content* | wt % | 90.0 |
| C4 content* | wt % | 10.0 |

TABLE 2-continued

| properties of component A | | Example 1 |
|---|---|---|
| split | wt % | 32 |
| MFR i + ii | g/10 min | 35.9 |
| Component iii | | |
| XSi* | wt % | 83 |
| C2 content* | wt % | 52 |
| split | wt % | 46 |
| total composition | | |
| MFR | g/10 min | 1.61 |
| IV on soluble in Xylene | dl/g | 2.4 |

Plates were obtained by injection molding, thereby producing a sheet having a thickness of about 2 mm from the polymer obtained in Example 1 and Adflex Q100F used as comparative example.

Print Test

The printer was a 3D Rostock delta printer. The printer conditions were the followings:

| Filament diameter | mm | 1.75 ± 0.03 |
|---|---|---|
| Nozzle diameter | mm | 0.4 |
| Temperature first layer | °C. | 245 |
| Temperature other layers | °C. | 245 |
| | | 1 |
| Layer high | mm | 0.2 |
| Infill | | 100% |
| printer speed | mm/min | 3600 |
| Speed first layer | | 60% |
| Speed other layers | | 100% |
| Speed infill | mm/min | 4.000 |

The sample was as depicted in FIG. 1. For each filament two printer tests were carried out at 40° C. and room temperature. At the end of the printing, the adhesion of the plate were determined. The results are reported in Table 3.

TABLE 3

| Plate | PP4 40° C. | PP4 RT | PP5 40° C. | PP5 RT | PLA RT |
|---|---|---|---|---|---|
| Q100F* | A2 | C3 | C1 | C3 | C0 |
| Example 1 | A3 | A2 | A3 | A3 | A2 |

*comparative
RT room temperature
A = the joint was adhesive and removable
C = the joint was cohesive
0 = no adhesion or cohesion
3 = complete adhesion or cohesion
Thus A value of A3 means that the adhesion was complete and the object was printable and removable.

What is claimed is:

1. A plate for use in an extrusion-based additive manufacturing system comprising a top layer, wherein the top layer comprises a sheet or a film, wherein the sheet or the film comprises a polyolefin composition A), wherein the polyolefin composition A) comprises:
   (i) 5-30% by weight of
      a propylene homopolymer containing 5% by weight or less of a fraction soluble in xylene at 25° C. (XS$_i$) or
      a propylene ethylene copolymer containing 90% by weight or more of propylene units containing 10% by weight or less of a fraction soluble in xylene at 25° C. (XS$_i$),
      both the amount of propylene units and of the fraction XS$_i$ being referred to the weight of (i);

(ii) 20-50% by weight of a copolymer of ethylene and a $C_3$-$C_8$ alpha-olefin containing from 0.1% to 20% by weight of alpha-olefin units and containing 25% by weight or less of a fraction soluble in xylene at 25° C. ($XS_{ii}$), both the amount of alpha-olefin units and of the fraction $XS_{ii}$ being referred to the weight of (ii); and (iii) 30-60% by weight of a copolymer of ethylene and propylene containing from 25% to 75% by weight of ethylene units and containing from 40% to 95% by weight of a fraction soluble in xylene at 25° C. ($XS_{iii}$), both the amount of ethylene units and of the fraction $XS_{iii}$ being referred to the weight of (iii);

wherein the amounts of (i), (ii) and (iii) being referred to the total weight of (i)+(ii)+(iii) and the sum of the amount of (i), (ii) and (iii) being 100.

2. The plate according to claim 1 wherein component i) is a propylene homopolymer.

3. The plate according to claim 1 wherein component i) ranges from 10% to 30% by weight; component ii) ranges from 25% to 45% by weight; and component iii) ranges from 35% to 55% by weight.

4. The plate according to claim 1 wherein component (i) has a melt flow rate at 230° C./2.16 kg ranging between 50 and 200 g/10 min.

5. The plate according to claim 1 wherein components (i)+(ii) blended together have a melt flow rate at 230° C./2.16 kg between 0.1 and 60 g/10 min.

6. The plate according to claim 1 wherein polyolefin composition A) has a melt flow rate at 230° C./2.16 kg between 0.1 and 6.0 g/10 min.

7. The plate according to claim 1 wherein the polyolefin composition A) has an intrinsic viscosity [η], measured in tetrahydronaphthalene at 135° C., of the xylene soluble fraction at 25° C. between 1.0 to 4.0 dl/g.

8. The plate according to claim 1 wherein the top layer comprises at least 50 wt % of the polyolefin composition A).

9. The plate according to claim 1 wherein the top layer comprises at least 70 wt % of the polyolefin composition A).

10. The plate according to claim 1 wherein the sheet or the film is the polyolefin composition A).

* * * * *

UNITED STATES PATENT AND TRADEMARK OFFICE
CERTIFICATE OF CORRECTION

PATENT NO. : 10,730,238 B2
APPLICATION NO. : 16/339101
DATED : August 4, 2020
INVENTOR(S) : De Palo et al.

It is certified that error appears in the above-identified patent and that said Letters Patent is hereby corrected as shown below:

On the Title Page

Item (54), Line 1, delete "POLYOLEF" and insert -- POLYOLEFIN --, therefor
Item (54), Line 2, delete "IN", therefor
Item (30), Line 1, delete "16192535" and insert -- 16192535.9 --, therefor Signed and Sealed this
First Day of November, 2022

Katherine Kelly Vidal
*Director of the United States Patent and Trademark Office*